United States Patent
Liu et al.

(10) Patent No.: US 7,385,668 B2
(45) Date of Patent: *Jun. 10, 2008

(54) METHOD OF CURING SEAL AND METHOD OF MANUFACTURING LIQUID CRYSTAL PANEL BY USING THE SAME

(75) Inventors: Te-Kuang Liu, Taoyuan (TW); Jen-Kuei Lu, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/307,041

(22) Filed: Jan. 20, 2006

(65) Prior Publication Data

US 2006/0197901 A1   Sep. 7, 2006

Related U.S. Application Data

(63) Continuation of application No. 10/250,034, filed on May 30, 2003, now Pat. No. 7,061,571.

(51) Int. Cl.
*G02F 1/1339* (2006.01)

(52) U.S. Cl. ...................... 349/190; 349/153
(58) Field of Classification Search ............... 349/153, 349/187, 190; 430/6, 7, 20, 321; 445/25
See application file for complete search history.

(56) References Cited

U.S. PATENT DOCUMENTS 5,566,008 A * 10/1996 Yoshida et al. ............... 349/86
2003/0218713 A1 * 11/2003 Suzuki et al. ............... 349/156

* cited by examiner

*Primary Examiner*—Dung Nguyen
*Assistant Examiner*—Tai Duong
(74) *Attorney, Agent, or Firm*—Jianq Chyun IP Office

(57) ABSTRACT

A method of curing a seal and a method of manufacturing a liquid crystal display panel by using the same is provided. To cure a seal between a first substrate and a second substrate of a liquid crystal display panel, a beam of ultraviolet light is irradiated at a predetermined angle of incidence calculated according to the law of total internal reflection into the first substrate and the second substrate respectively. The beam of ultraviolet will irradiate the seal without causing any damage to the liquid crystal inside the display panel.

10 Claims, 3 Drawing Sheets

METHOD OF CURING SEAL AND METHOD OF MANUFACTURING LIQUID CRYSTAL PANEL BY USING THE SAME

CROSS-REFERENCE TO RELATED APPLICATION

This application is a continuation of a prior application Ser. No. 10/250,034, filed May 30, 2003, now U.S. Pat. No. 7,061,571 which claims the priority benefit of Taiwan application serial no. 92107066, filed on Mar. 28, 2003. All disclosures are incorporated herewith by reference.

BACKGROUND OF THE INVENTION

1. Field of Invention

The present invention relates to a method of manufacturing a liquid crystal display panel. More particularly, the present invention relates to a method of curing a seal and a method of manufacturing a liquid crystal panel by using the same.

2. Description of Related Art

Following the rapid advance in high-tech electronics products, video and especially digital video and imaging devices have become common electrical appliances in our offices and homes. Among the video and imaging devices, displays are very important and indispensable devices for showing data interactively. Through a display device, a user can read out important information or use the information to control a particular system.

To fit into our current style of living, the video or imaging products are becoming slimmer and lighter. Although a conventional cathode ray tube (CRT) can still provide clear images at a relatively low cost, it is gradually being phased out because of bulkiness and relatively large power consumption. With the great advances in opto-electric technologies and semiconductor fabrication techniques in recent years, flat panel displays such as the liquid crystal displays have become the most common display product. The advantages of the liquid crystal displays include a low operating voltage and a radiation free operation. In addition, the liquid crystal panel not only has a weight considerably less than a CRT, but also occupies a volume considerably less than a CRT. Together with some other flat panel displays such as the plasma displays and the electroluminance displays, some researchers have forecast the increasing use of liquid crystal displays in the 21$^{st}$ century.

One major type of liquid crystal display is the so-called thin film transistor (TFT) liquid crystal display (LCD). The TFT-LCD comprises a thin film transistor array substrate, a color-filtering array substrate and some liquid crystals as shown in FIGS. 1A and 1B.

FIG. 1A is a top view showing the layout of the liquid crystal panel of a conventional thin film transistor liquid crystal display. FIG. 1B is a cross-sectional view along line I-I' of FIG. 1A. As shown in FIGS. 1A and 1B, the liquid crystal panel 100 of the thin film transistor liquid crystal display (TFT-LCD) comprises a thin film transistor array substrate 102, a color-filtering array substrate 104 and some liquid crystals 106. The liquid crystals 106 fill up the space between the thin film transistor array substrate 102 and the color-filtering array substrate 104. To prevent the liquid crystals 106 from leaking away, a seal 108 is set up around the edges of the overlapping region between the thin film transistor array substrate 102 and the color-filtering array substrate 104.

At present, there are two major types of seals 108, the thermal curing type and the ultraviolet (UV) curing type. To fabricate a liquid crystal display panel using the thermal curing seal, thermal curing seal is smeared around the edges of the color-filtering array substrate 104. The color-filtering array substrate 104 is aligned over the thin film transistor array substrate 102 and the two are pressed together so that they are joined through the seal 108. Thereafter, a jig press or a hot press is used to cure the seal 108 in a thermal curing process. After the seal 108 is fully solidified, liquid crystals 106 are injected into the space between the thin film transistor array substrate 102 and the color-filtering array substrate 104 and bounded by the solidified seal 108. Afterwards, the injection hole is sealed with UV plastic material. Similarly, to fabricate a liquid crystal display panel using an UV seal, UV sealing material is smeared around the edges of the color-filtering array substrate 104. The color-filtering array substrate 104 is aligned over the thin film transistor array substrate 102 and the two are pressed together so that they are joined through the UV seal 108. Thereafter, the UV seal 108 is irradiated with UV light to cure the UV seal. In the conventional UV exposure method, the UV light penetrates through the panel. After the UV curing process, liquid crystals 106 are injected into the space between the thin film transistor array substrate 102 and the color-filtering array substrate 104 and bounded by the solidified seal 108. Afterwards, the injection hole is sealed with UV plastic material.

Due to the material limitations of sealing material and the reliability of the panel, conventional thin film transistor liquid crystal display opts for the thermal curing type of seals. However, the thermal curing type of seal has a long curing period and upper/lower substrate alignment problem. Moreover, the curing period is too long for applying the new one-drop filling method. The so-called one-drop filling method includes dropping liquid crystals directly into the region bounded by the UV seal 108 after the UV seal is applied to the edges of the thin film transistor array substrate 102. Due to the long curing period of the thermal curing seal and the possible contamination of the liquid crystals during the curing process, thermal curing seal is unsuitable for carrying through with the one-drop filling process.

Therefore, the UV seal is almost exclusively deployed when the one-drop filling process is used. However, the conventional UV exposure method uses a beam of penetrating UV light to irradiate the UV seal so that the liquid crystals adjacent to the UV seal may also be irradiated. Since liquid crystals can absorb ultraviolet light within a definite wavelength range (for example, between 100 to 400 nm), the penetrating UV beam may damage some of the liquid crystal molecules leading to the production of a defective display screen. To prevent this from happening, either a UV beam having constituent wavelengths outside the absorption range of the liquid crystal molecules is used to cure the UV seal or the UV curing method as shown in FIG. 2 is used to cure the UV seal.

FIG. 2 is a magnified view of a portion of the area labeled 11 in FIG. 1B. As shown in FIG. 2, an additional mask 214 is formed over the liquid crystal layer 206 in the process of curing the seal 208 between the thin film transistor array substrate 202 and the color-filtering array substrate 204 to block the light from a UV source 212. Alternatively, the black matrix 210 and the color thin film within the color-filtering array substrate 204 are used as a mask to block the UV light 212.

There are two shortcomings resulting from the above, improved process. One is that it makes the process complicated and raises the cost owing to the additional mask. The other shortcoming is that when the black matrix and the color thin film within the color-filtering array substrate can not block ultraviolet light within a definite wavelength range, it is ineffective to use the black matrix and the color thin film within the color-filtering array substrate as a mask.

When the black matrix 210 is used to block UV light, a portion of the seal 208 may be shielded from UV light and prevented from a UV cure. Furthermore, if the black matrix 210 happens to block off all UV light heading for the UV seal 208, the conventional method of curing with penetrating UV light can no longer be applied.

SUMMARY OF THE INVENTION

Accordingly, one object of the present invention is to provide a method of curing a seal and a method of manufacturing a liquid crystal display panel by using the same, such that the liquid crystals within the display panel are prevented from absorbing any ultraviolet (UV) light.

A second object of this invention is to provide a method of curing a seal and a method of manufacturing a liquid crystal display panel by using the same, such that the processing steps for fabricating the display panel are simplified.

A third object of this invention is to provide a method of curing a seal and a method of manufacturing a liquid crystal display panel by using the same, such that the production cost for fabricating the display panel is reduced.

To achieve these and other advantages and in accordance with the purpose of the invention, as embodied and broadly described herein, the invention provides a method of curing a seal on the surface of a substrate. To cure the seal, a beam of ultraviolet light is irradiated at a predetermined angle into the substrate so that the beam of UV light entering the substrate is reflected a multiple of times according to the law of total internal reflection before arriving at the seal.

This invention also provides a method of manufacturing a liquid crystal display panel. First, a first substrate and a second substrate are provided. Each of the first substrate and the second substrate has a front surface, a back surface and a side surface. A seal is formed on the front surface of the first substrate and then liquid crystal is dropped into the area above the front surface of the first substrate and bounded by the seal. Thereafter, the second substrate is stacked on top of the first substrate so that the front surface of the first substrate faces the front surface of the second substrate. A first beam of ultraviolet light set at a first angle relative to the side surface of the first substrate for producing a total internal reflection inside the first substrate is irradiated on the side surface of the first substrate and nearby areas. Similarly, a second beam of ultraviolet light set at a second angle relative to the side surface of the second substrate for producing a total internal reflection inside the second substrate is irradiated on the side surface of the second substrate and nearby areas.

In this invention, a mechanism quite different from the conventional penetration method is used to cure the seal on top of a substrate. Here, a beam of ultraviolet light set at an appropriate angle for producing a total internal reflection inside the substrate is aimed at the side surface of the substrate. The beam of UV light emerges from the substrate when it encounters the seal. Hence, the source UV light is able to pinpoint the seal without damaging the liquid crystals through UV absorption. In addition, once the refractive index of both the substrate and the seal are found, one can easily set the angle of the source UV beam to perform the curing process. In other words, there is no need to fabricate a light-blocking mask or to avoid using UV light that might be absorbed by the liquid crystal as in the conventional method.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1A:
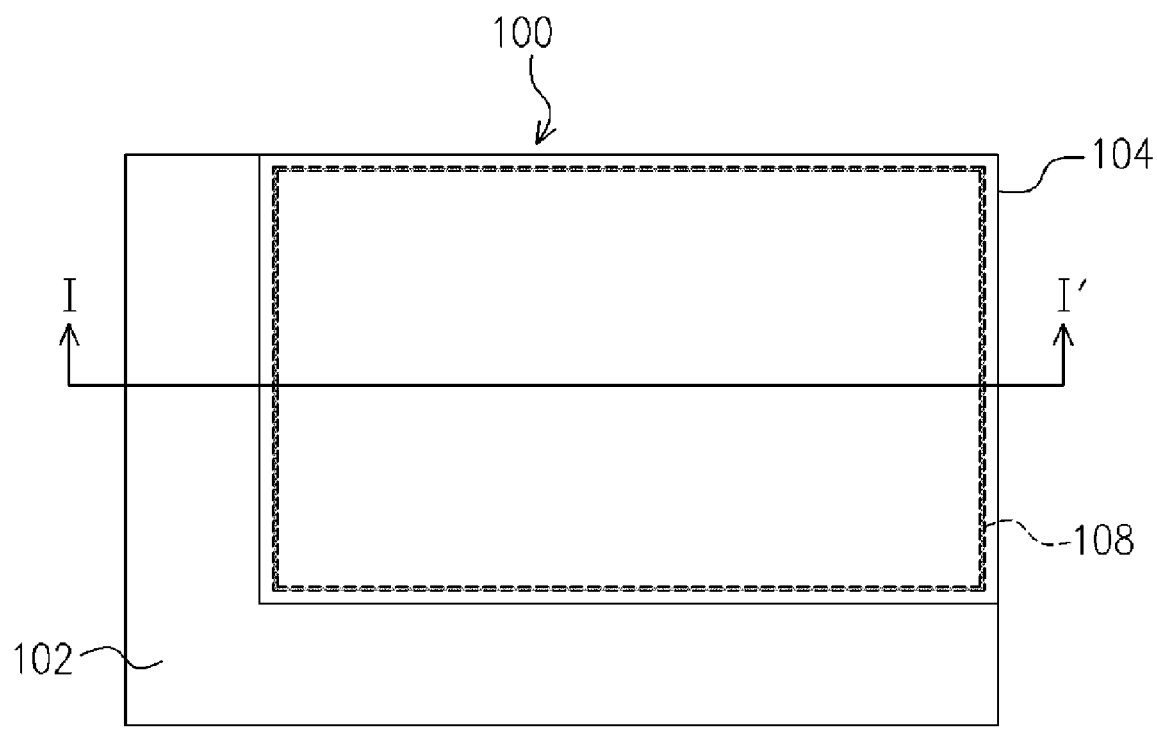
FIG. 1A is a top view showing the layout of the liquid crystal panel of a conventional thin film transistor liquid crystal display.
Figure 1B:
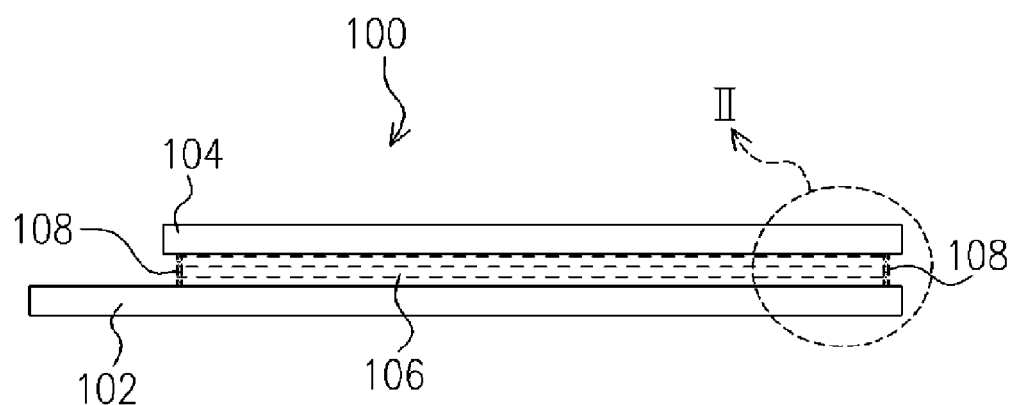
FIG. 1B is a cross-sectional view along line I-I' of FIG. 1A.
Figure 2:
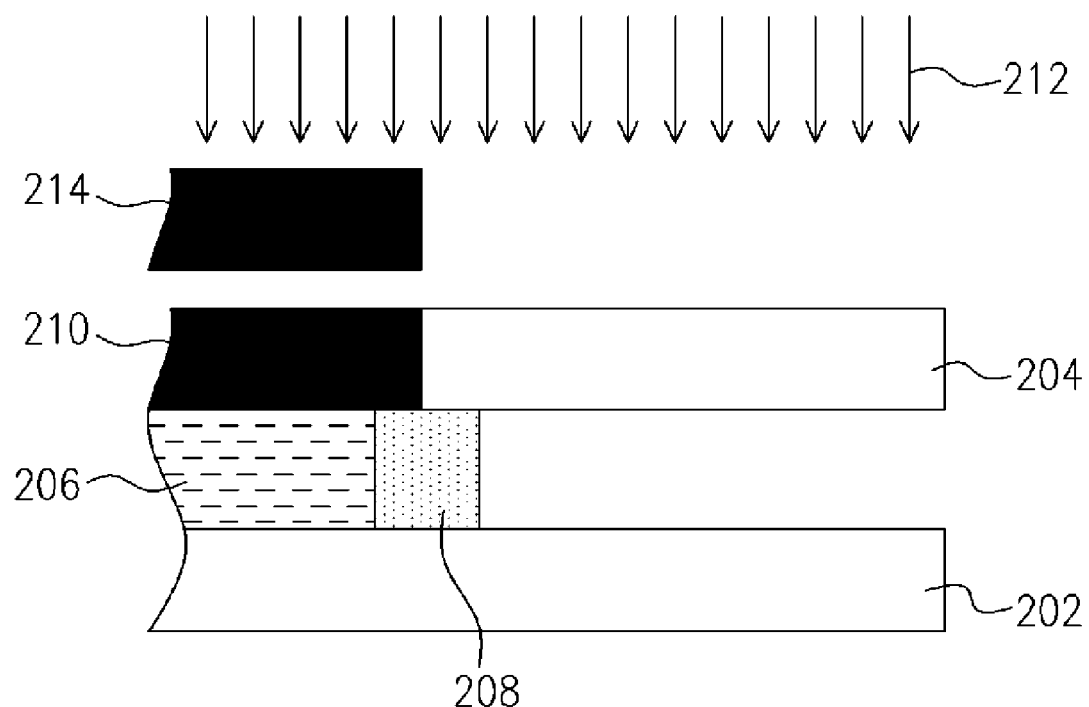
FIG. 2 is a magnified view of a portion of the area labeled II in FIG. 1B.

Reference will now be made in detail to the present preferred embodiments of the invention, examples of which are illustrated in the accompanying drawings. Wherever possible, the same reference numbers are used in the drawings and the description to refer to the same or like parts.

Figure 3:
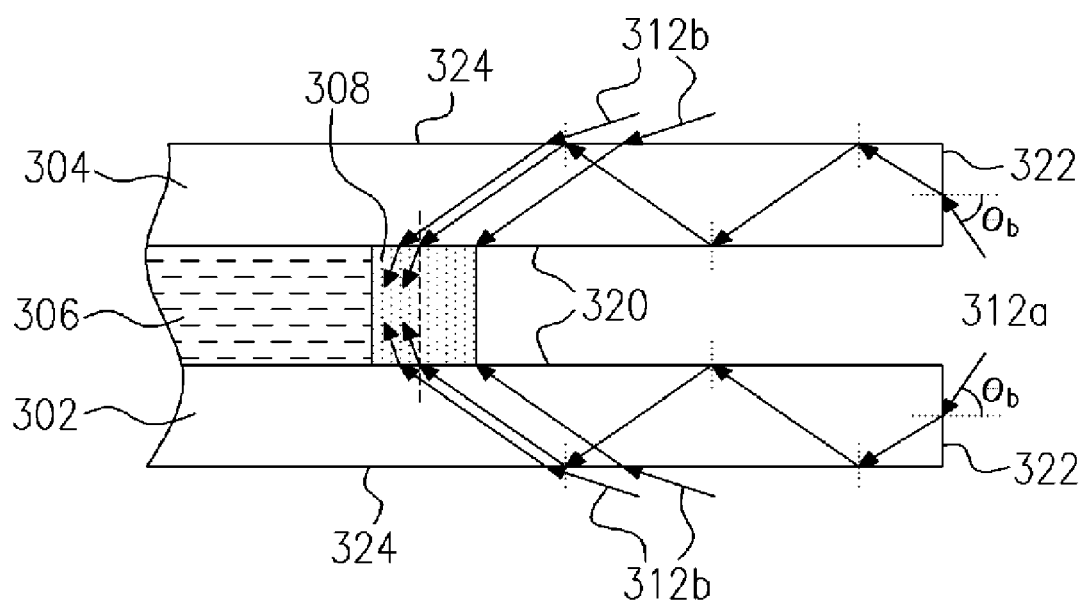
FIG. 3 is a schematic cross-sectional view showing a beam of ultraviolet light aiming at the side surfaces of a liquid crystal display panel in a seal curing process according to one preferred embodiment of this invention.

FIG. 3 is a schematic cross-sectional view showing a beam of ultraviolet light aiming at the side surfaces of a liquid crystal display panel in a seal curing process according to one preferred embodiment of this invention. As shown in FIG. 3, the method according to this invention can be applied to cure a seal 308 between a first substrate 302 and a second substrate 304. The first substrate 302 and the second substrate 304 each has a front surface 320, a back surface 324 and a side surface 322. The front surface 320 of the first substrate 302 and the second substrate 304 face each other. The seal 308 is fabricated using a material including, for example, ultraviolet (UV) plastic. The seal 308 has a width of between about 500 μm to 3000 μm and a thickness of about 2 μm to 10 μm (seal thickness depends on cell design.) The first substrate 302 and the second substrate 304 are fabricated using glass, for example.

This embodiment of this invention utilizes the law of total internal reflection to direct a beam of ultraviolet (UV) light 312a at an angle relative to the side surface 322 of the first substrate 302 and the second substrate 304 or a beam of UV light 312b at the same angle relative to a surface adjacent to the side surface 322 such as the back surface 324 of the first substrate 302 and the second substrate 304 as shown in FIG. 3. The angle of incidence $\theta_b$ of the UV light beam is determined by the refractive index of the first substrate 302, the second substrate 304 and the seal 308. The seal 308 must have a refractive index greater than the first substrate 302 and the second substrate 304. Preferably, the seal 308 has a refractive index considerably higher than the first substrate 302 and the second substrate 304. The angle of incidence $\theta_b$ of the UV light beam can be given by the formula:

$\theta_b = \sin^{-1}((n^2(\text{substrate}) - n^2(\text{external}))^{1/2}/n(\text{external}))$, where n(substrate) is the refractive index of the substrate, n(external) is the refractive index of the external media.

In addition, a beam of UV light 312 is directed at the predetermined angle $\theta_b$ into the substrate 302, 304 through an optical fiber tube, a prism or other reflective plate design, for example. Furthermore, the angle of incidence $\theta_b$ is also related to the distance between the seal 308 and the substrate 302, 304 and the thickness of the substrate 302, 304. In fact, the distance from the side surface 322 of the substrate 302, 304 to the seal 308 and the thickness of the substrate 302, 304 must be set according to the law of total internal reflection to direct the UV light beam 312a, 312b at the seal 308 after a multiple of internal reflections.

Figure 4:
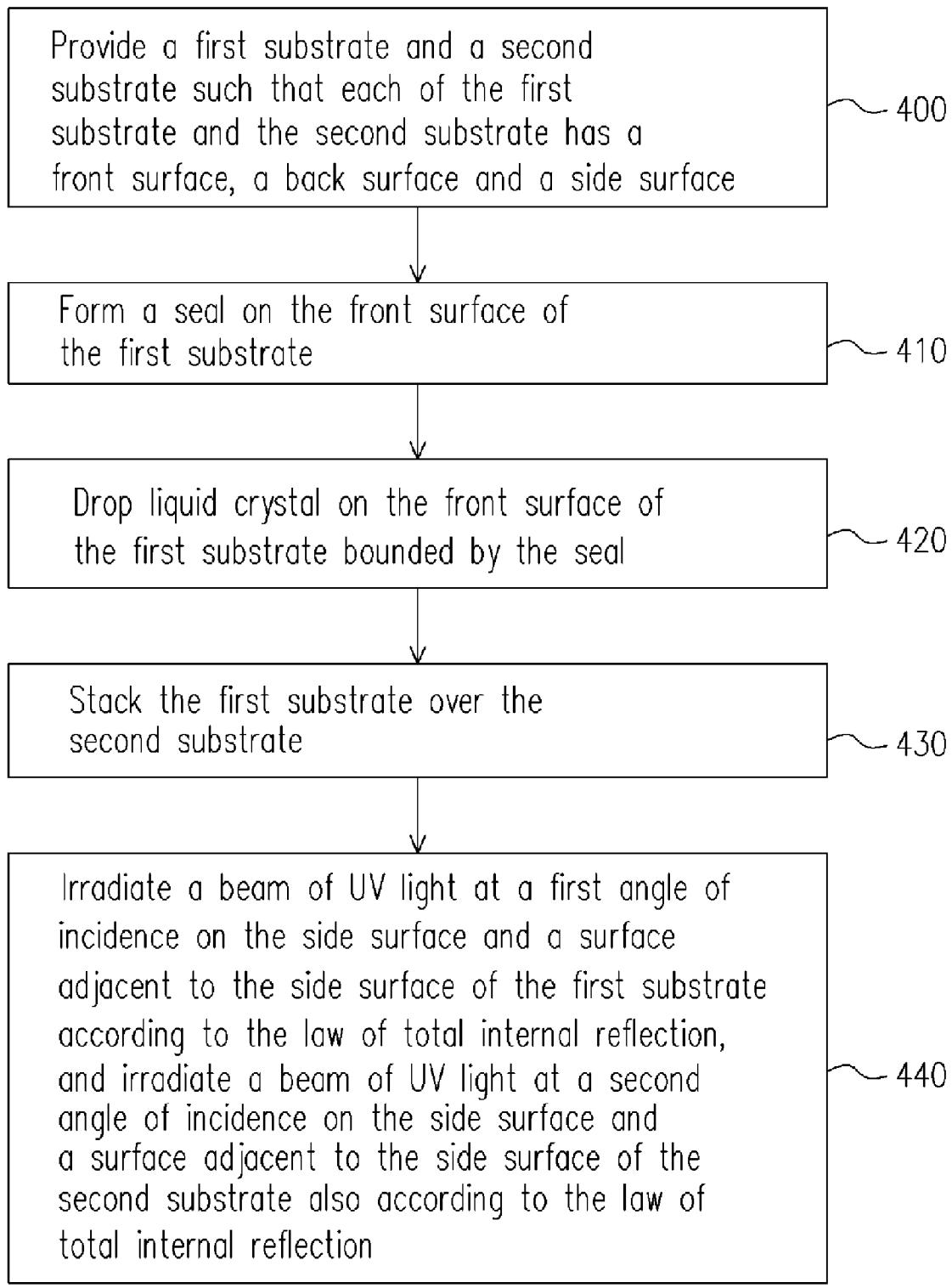
FIG. 4 is a flow chart showing the steps for fabricating a liquid crystal display panel using the seal curing method according to this invention.

FIG. 4 is a flow chart showing the steps for fabricating a liquid crystal display panel using the seal curing method according to this invention. In step 400, a first substrate and a second substrate are provided. Each of the first substrate and the second substrate has a front surface, a back surface and a side surface. In step 410, a seal is formed on the front surface of the first substrate. In step 420, liquid crystal is dropped into the area on the front surface of the first substrate and bounded by the seal. Thereafter, in step 430, the second substrate is stacked over the first substrate such that the front surface of the first substrate faces the front surface of the second substrate. In step 440, a beam of ultraviolet (UV) light is irradiated at a first angle of incidence $\theta_a$ on the side surface and the surface adjacent to the side surface of the first substrate according to the law of total internal reflection. In the meantime, a beam of ultraviolet (UV) light is irradiated at a second angle of incidence $\theta_b$ on the side surface and the surface adjacent to the side surface of the second substrate again according to the law of total internal reflection. The first angle of incidence $\theta_a$ is given by the formula:

$\theta_a = \sin^{-1}((n^2(\text{first\_substrate}) - n^2(\text{external}))^{1/2}/n(\text{external}))$, where n(first_substrate) is the refractive index of the first substrate, n(external) is the refractive index of the external media. Similarly, the second angle of incidence $\theta_b$ is given by the formula:

$\theta_b = \sin^{-1}((n^2(\text{second\_substrate}) - n^2(\text{external}))^{1/2}/n(\text{external}))$, where n(second_substrate) is the refractive index of the first substrate, n(external) is the refractive index of the external media. In addition, a beam of UV light is directed at the predetermined angle $\theta_a$ into the first substrate 302 and the predetermined angle $\theta_b$ into the second substrate 304 through an optical fiber, a prism or other reflective plate design, for example.

In this invention, a mechanism quite different from the conventional penetration method is used to cure the seal on top of a substrate. After finding the angle for producing a total internal reflection inside the substrate through the law of total internal reflection, a beam of ultraviolet light set at the appropriate angle for producing a total internal reflection inside the substrate is aimed at the side surface of the substrate. The beam of UV light emerges from the substrate when it encounters the seal. Hence, the source UV light is able to pinpoint the seal without damaging the liquid crystals through UV absorption. In addition, once the refractive index of both the substrate and the seal are found, one can easily set the angle of the source UV beam to perform the curing process. In other words, there is no need to fabricate a light-blocking mask or to avoid using UV light that might be absorbed by the liquid crystal as in the conventional method.

Furthermore, the application of this invention is assisted when the seal is completely or partially overshadowed by a black matrix on the substrate because the black matrix will protect the liquid crystal layer inside the panel. In particular, if the black matrix completely covers the UV seal, the UV beam will pinpoint and cure the seal without causing any damage to the liquid crystal due to strayed light passing through other substrate areas.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of curing a seal on a surface of a substrate in an external medium, comprising:

aiming a beam into a side surface of the substrate by an incident angle θ, wherein the incident angle θ is given by the formula:

$$\theta = \sin^{-1}\left(\frac{\sqrt{n^2(\text{substrate}) - n^2(\text{external})}}{n(\text{external})}\right)$$

where n(substrate) is the refractive index of the substrate and n(external) is the refractive index of the external medium and the beam travels to the seal only by total reflection in the substrate after the beam is incident to the substrate.

2. The method of claim 1, wherein the seal has a refractive index higher than the substrate.

3. The method of claim 1, wherein the seal is fabricated using ultraviolet plastic.

4. The method of claim 1, wherein the substrate is fabricated using glass.

5. The method of claim 1, wherein the seal has a width between about 500 μm to 3000 μm.

6. The method of claim 1, wherein the seal has a thickness about 2 μm to 10 μm.

7. The method of claim 1, wherein the beam is channeled at the angle of incidence into the substrate through an optical fiber tube.

8. The method of claim 1, wherein the beam is channeled at the angle of incidence into the substrate through a prism.

9. The method of claim 1, wherein the beam is channeled at the angle of incidence into the substrate through a reflecting plate.

10. The method of claim 1, wherein the beam comprises ultraviolet light.

* * * * *